UNITED STATES PATENT OFFICE.

STERLING L. BAILEY, OF CHICAGO, ILLINOIS.

METHOD OF SOFTENING HARD WATER.

SPECIFICATION forming part of Letters Patent No. 553,383, dated January 21, 1896.

Application filed May 2, 1895. Serial No. 547,831. (No specimens.)

*To all whom it may concern:*

Be it known that I, STERLING L. BAILEY, a citizen of the United States, residing in Chicago, in the county of Cook and State of Illinois, have invented a new and useful Improvement in the Art of Rendering Hard Water Soft, of which the following is a specification.

I have discovered by experiment that hard water may be rendered soft and better adapted for washing and bathing purposes by bringing it in contact with metallic zinc. Thus if a piece of metal zinc be placed in a kettle or vessel containing ordinary hard water—such, for example, as the water of Lake Michigan, which is the water I have principally experimented with as it comes from the water-pipes in the city of Chicago—and the kettle placed upon a stove so that the water becomes heated, the water will be rendered soft and capable of producing abundant lather with ordinary soap, a quality that the water does not possess previous to this treatment with the zinc. I find that the hotter the water is while in contact with the zinc the quicker the action seems to be and the sooner the result of softening the water is obtained. I propose to utilize this discovery in various ways. Thus the water for laundry purposes may be rendered soft and more available either by leading the hot water through zinc pipes or through a chamber or cylinder containing fragments or surfaces of zinc. Bath-tubs may be wholly or partly lined with zinc, or the hot-water pipes connecting with the bath-tub may be provided with a cylinder or chamber containing zinc, or the reservoir for holding the bath-water supply may be fitted with zinc partitions, linings or surfaces, or the vessel in which the water for the bath is heated may contain surfaces, linings or fragments of metallic zinc.

The best method of practicing my invention is to bring the water in a heated state, as near the boiling-point as possible, into contact with a surface of metallic zinc in such manner that all of the water will have opportunity to be affected, and I prefer to do this by passing the hot water through a cylinder containing plates or partitions of zinc so arranged in the cylinder that the water shall have a tortuous passage in contact with zinc surfaces.

When the zinc has lost its property of softening the water by long-continued use, it should be removed and further zinc supplied in its place, the old zinc being melted up and recast to present fresh surfaces.

I do not pretend to understand the scientific reason why zinc should act in the manner I have found it does act to soften hard water, nor do I yet know whether it will operate to soften all kinds of hard water; but I do know that it will soften the hard water of Lake Michigan in the manner I have described above, and I believe it will operate to soften most of the hard waters.

I claim—

1. The art of softening hard water, which consists in bringing the hard water into contact with metallic zinc, substantially as specified.

2. The art of softening hard water, which consists in bringing the water in a heated state in contact with metallic zinc, substantially as specified.

STERLING L. BAILEY.

Witnesses:
H. M. MUNDAY,
EDMUND ADCOCK.